United States Patent [19]
Eaton

[11] 3,871,709
[45] Mar. 18, 1975

[54] AIRCRAFT WHEEL CONSTRUCTION

[76] Inventor: William Joseph Eaton, 4042 Valley Dr., Pueblo, Colo. 81008

[22] Filed: July 23, 1973

[21] Appl. No.: 381,501

[52] U.S. Cl. ......... 301/63 DS, 244/103 R, 301/6 A, 301/11, 301/105 S
[51] Int. Cl. .................... B60b 3/08, B64c 25/32
[58] Field of Search ......... 244/103 R; 301/6 A, 6 R, 301/23, 11 R, 63 DD, 63 DS, 105 S, 63 D, 11 CD, 22; 152/402, 403, 405, 406

[56] References Cited
UNITED STATES PATENTS

| 1,415,427 | 5/1922 | Betzell | 301/63 D |
|---|---|---|---|
| 1,659,387 | 2/1928 | Adel | 301/63 DD |
| 1,961,095 | 5/1934 | Baker et al. | 301/23 |
| 2,187,777 | 1/1940 | Gannett | 301/63 DS |
| 2,406,068 | 8/1946 | Frank | 301/63 DD |
| 2,440,858 | 5/1948 | Hollerith | 301/63 DS |
| 2,871,905 | 2/1959 | Stanton | 301/6 A |
| 2,948,568 | 2/1960 | Kykes et al. | 152/406 |

Primary Examiner—Trygve M. Blix
Assistant Examiner—Galen L. Barefoot
Attorney, Agent, or Firm—Robert E. Geauque

[57] ABSTRACT

An aircraft wheel construction wherein flanges are mounted upon a rim, the flanges to restrain laterally an inflatable tire, the flanges being mounted for slight pivotal movement when subjected to lateral loads, the discs which are connected between the rim of the wheel and the hub section are mounted for slight pivotal movement in respect to the rim and the hub section.

8 Claims, 7 Drawing Figures

3,871,709

AIRCRAFT WHEEL CONSTRUCTION

BACKGROUND OF THE INVENTION

This invention relates to a novel construction of a wheel for an aircraft landing gear wherein bending moment stresses are minimized so as to provide longer wheel life and higher load carrying capability.

Most aircraft wheels are made of a single forging or made of two or three forged parts which are interconnected together in a fixed manner. When the aircraft lands or during take-off, substantial forces are transferred through the aircraft wheels. The most damaging type of forces are bending moments which are created during ground handling conditions of the aircraft. These bending moments, in a very short period of time, cause failure of the aircraft wheel itself requiring replacement.

SUMMARY OF THE INVENTION

The aircraft wheel construction of this invention provides for forming the wheel into a plurality of parts comprising a pair of flanges which are to be in direct contact with the inflatable tire and support such laterally, a rim, a pair of discs which interconnect the rim to the hub section and the hub section is mounted upon the wheel axle of the aircraft. Each of the flanges are mounted for slight pivotal movement relative to the rim. The discs are also mounted for slight pivotal movement relative to the rim and also to the hub section. As a result, the lateral loads which are imparted from the tire to the wheels, which in conventional wheels resulted in bending moments being conducted through the wheel, are caused to be substantially eliminated at junction areas of the wheel where normally high stress concentration occur. Bending stresses are imparted to the wheel by internal pressure and the following aircraft maneuvers: rolling, turning, braking, the spinup of the aircraft wheel at landing, landing impact, and rough terrain of the airfield.

Primary objectives of the aircraft wheel of this invention are longer useful life of the aircraft wheel and economy in the cost of production and logistics of supply.

DETAILED DESCRIPTION OF THE SHOWN EMBODIMENT

Figure 1:
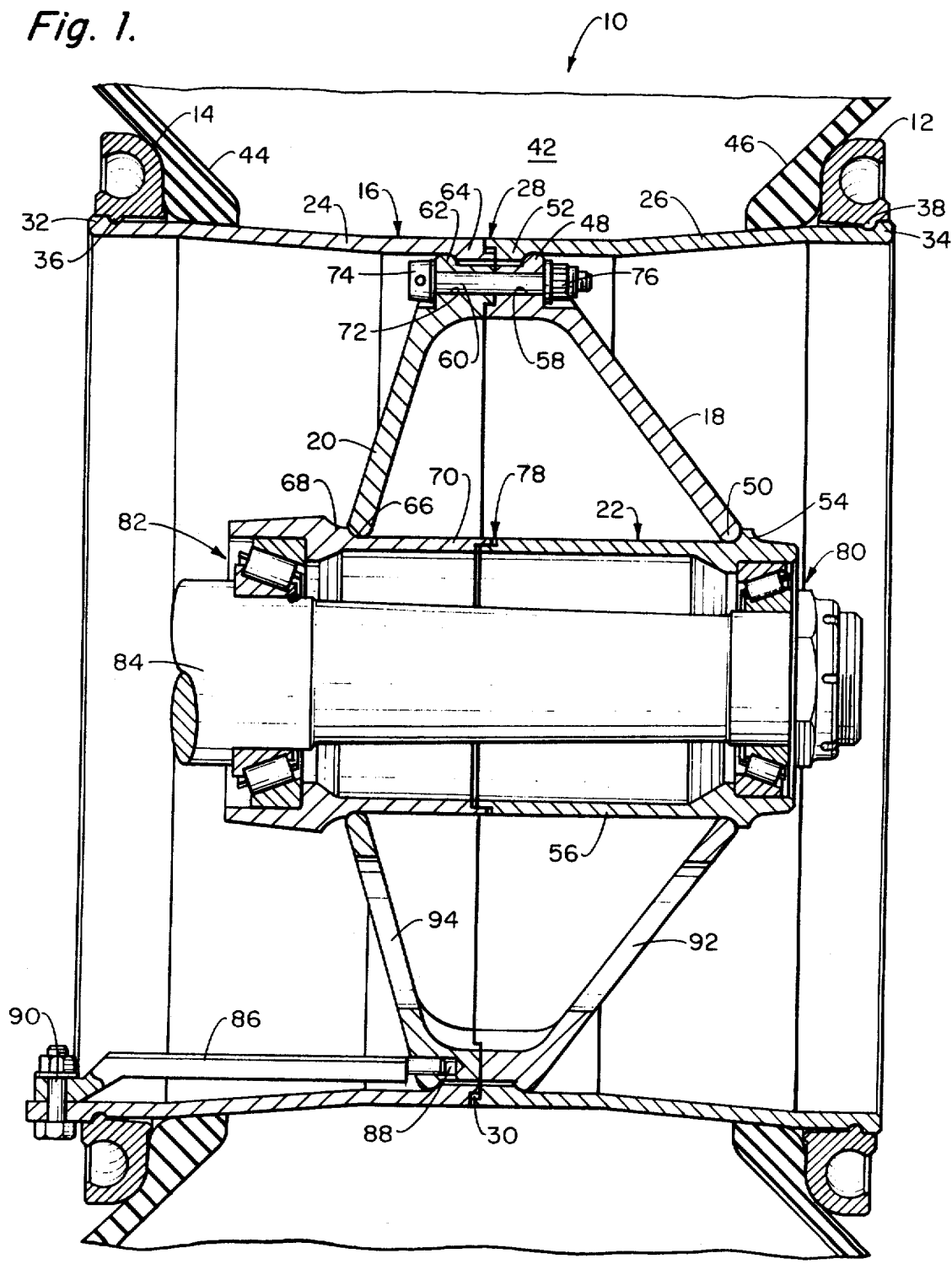
FIG. 1 is a cross-sectional view of the aircraft wheel of this invention showing how such is to be mounted upon an aircraft wheel axle.

Referring particularly to the drawings, there is shown in FIG. 1 the aircraft wheel 10 of this invention which is composed basically of flanges 12 and 14 mounted upon a rim 16, discs 18 and 20 connecting the rim 16 to a hub section 22. The rim 16 is composed of two basically cylindrical shaped elements 24 and 26. Flange 14 is mounted exteriorly upon the element 24 in the vicinity of its outer edge. Flange 12 is mounted in a similar manner exteriorly upon the section 26. The elements 24 and 26 are connected together in an annular overlapping shoulder arrangement 28. The shoulder arrangement 28 is such that a slight gap 30 is formed between the elements 24 and 26. The function of this gap 30 will be explained further on in the specification.

The rim 16 is a solid cross-section throughout its circumference except for an access hole (not shown) to provide for a conventional tire valve stem (not shown).

Formed upon the exterior surface of the element 24 adjacent to its outer edge is an annular shoulder 32. A similar shoulder 34 is formed upon the element 26 adjacent its outer edge. Flange 14 is formed substantially in the shape of a ring and includes an annular protrusion 36 on its inner surface. A similar protrusion 38 is formed upon the flange 12 which is also of a ring configuration. Protrusion 36 is to be in contact with the shoulder 34. It is to be noted that the ring 12 is substantially identical to the ring 14 with such only being mounted in reverse to one another upon the rim 16.

The annular space located between the flanges 12 and 14 is what is referred to as the tube well 42. Within the tube well 42 can be located an inflatable inner tube (not shown). Edge 44 of the tire is to be positioned against the flange 14 with edge 46 of the tire being positioned against the flange 12. Any lateral load produced in the tire due to the aircraft turning, braking, rough terrain, or other causes, is transmitted to either or both of the flanges 12 or 14. This lateral load, in a conventional wheel assembly, results in a bending moment being transferred through the flange and into the rim and through the other portions of the wheel assembly. Such bending moments are prime or limiting factors with regard to life of the wheel.

It is desirable to minimize this bending moment and this is accomplished by permitting slight pivotal movement of the flanges 12 and 14 with respect to the rim 16. When the lateral load is transferred to the flange, the flange is permitted to pivot slightly as depicted in phantom shown in FIG. 2 of the drawings. The pivoting movement of the flange is permitted due to the rounded configuration of the protrusion 38 which is positioned against the shoulder 34. In a conventional aircraft wheel assembly the force acting upon the flange 12 or 14 would create a moment with respect to the rim 16. However, with the wheel construction of this invention, this moment is substantially eliminated due to the pivotal deflection of the flange. The forces are transferred directly through the connection of the protrusion 36 and 38 which cooperates with its respective shoulders 32 and 34. The bending moment about the pivotal connection is depicted by the location of the forces $F_1$ in FIG. 2. The forces $F_1$ are transmitted through protrusion 38 to shoulder 34. The transmission of forces to the shoulder 34 can be represented as forces $F_2$ and $F_3$ where $F_2$ is a axial component with $F_3$ being a radial component.

Disc 18 is substantially conical in configuration and includes an annular outer protrusion 48 and an annular inner edge 50. Protrusion 48 and the edge 50 are both basically round in its outer configuration. Formed interiorly of the element 26 of the rim 16 is an annular shoulder 52. The shoulder 52 is to be in continuous contact with the protrusion 48. Edge 50 is to be in contact with an annular shoulder 54 formed upon the element 56 of the hub section 22. An aperture 58 is formed within the disc 18 adjacent the protrusion 48. The aperture 58 cooperates with a bolt 60. It is to be understood that there will be several such apertures 58 employed circumferentially located and equally-spaced apart about disc 18.

Disc 20 includes a rounded protrusion 62 which is to cooperate with shoulder 64 formed upon the element 24 of the rim 16. The disc 20, at its inner end, includes an annular rounded edge 66. Edge 66 is to cooperate with an annular shoulder 68 formed upon element 70 of the hub section 22.

It is to be noted that both the discs 18 and 20 are basically of a conical configuration. However, the conical configuration of disc 18 is substantially accentuated when compared to disc 20. As a result, the space located within the confines of the element 24 and adjacent the disc 20 is larger than the space located about the element 26 and adjacent the disc 18. The reason for this is that within the larger space located adjacent disc 20, a braking element is to be located (only on main wheels and not on nose wheels). This braking element is not shown but is deemed to be conventional in aircraft wheel constructions. If a brake is not used, discs 18 and 20 would be centered within the element 24.

Also formed within the disc 20 is an aperture 72. The aperture 72 is to be in alignment with the aperture 58 with the bolt 60 extending through both apertures 72 and 58. The head 74 of the bolt 60 is to abut a portion of the disc 20 with the nut 76 of the bolt 60 being in abutting contact with the disc 18. It is to be noted that the discs 20 and 18 cooperate together in an interlocking relationship with the bolts 60 to hold such in that relationship. It is to be understood that a plurality of such bolts 60 will be circumferentially located about the discs.

The bolts 60 function to retain together the discs 20 and 18 in a substantially tight integral unit. Also, because of the pivot type of connections between the protrusion 48 and the shoulder 52 and the protrusion 62 and the shoulder 64, a slight amount of pivotal movement is permitted between the disc 18 and the element 26 and the disc 20 and the element 24. As a result, the forces which are transmitted from the rim elements 24 and 26 are transmitted directly through the respective protrusions 48 and 62 which substantially eliminates bending moments being established between the rim 16 and the discs 18 and 20.

As is readily apparent from the drawings, the disc 18 is permitted to slightly pivot about the element 56 of the hub section 22 by reason of the rounded edge 50 cooperating with the shoulder 54. In a similar manner, the disc 20 is permitted to slightly pivot with respect to the element 70 by reason of the rounded edge 66 pivoting with respect to shoulder 68. This also serves to eliminate bending moments being established between the discs 18 and 20 and the hub section 22.

The elements 56 and 70 of the hub section 22 are interlocked together at joint 78. The joint 78 is established in an overlapping relationship with the elements 56 and 70 being interconnected in a tight fitting manner. The hub section 78 is substantially hollow and includes an interior bearing assembly 80 located within the element 56. A second bearing assembly 82 is located within the element 70. A wheel axle 84 is connected to the aircraft landing gear (not shown) and extends within the hub section 22 and is connected to the inner races of the bearings 80 and 82. As a result, the hub section 22 as well as the entire wheel assembly 10 of this invention is rotatably mounted upon the wheel axle 84.

A number of rotor drive keys 86, if required, are spaced around the circumference of the element 24 of the rim 16. One end of each of the keys 86 is received within an opening 88 of the disc 20. The other end of the key is bolted by means of a bolt 90 to the element 24. The rotor drive keys 86 are thus held in place on the element 24 and are to drive the rotatable parts of the brake, not shown. The use of such rotor drive keys 86 are deemed to be conventional and form no specific part of this invention and need not be described here in detail.

The disc 18 includes a plurality of apertures 92 which are to function for optimum material usage to meet required performance and also can function for ventilation holes if a brake is used. In a similar manner the disc 20 has holes 94.

Figure 2:
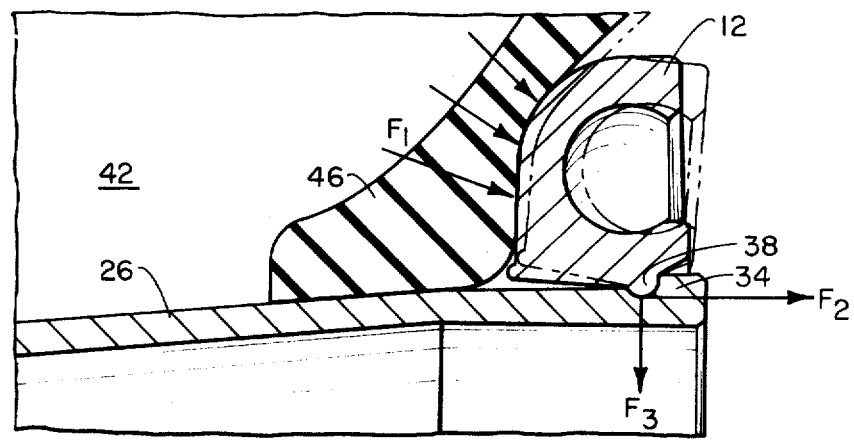
FIG. 2 is an enlarged view of the tire and its associated flange for lateral support showing how such is to pivot when incurring significant lateral loads.

In summary, in regard to the structure shown in FIGS. 1 and 2 of the drawings, normally damaging moments due to lateral tire loads will be minimized and primarily forces will be transmitted through the pivot connection 38 and 34, 32 and 36, 48 and 52, 62 and 64, 68 and 66, and 50 and 54. The wheel 10 of this invention forms an extremely strong wheel assembly. Because of the construction of the wheel of this invention, the wheel improves the lfe and load carrying capabilities of the wheel assembly 10 of this invention.

Figure 3:
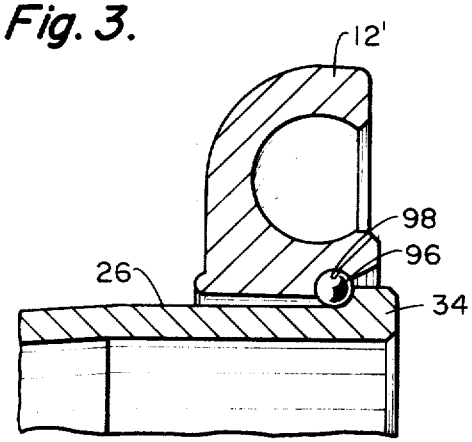
FIG. 3 is a cross-sectional view of a modified form of pivot connection between the flange and the rim.

Referring particularly to FIG. 3 of the drawing, a similar flange 12' is shown. The flange 12' is to cooperate in basically the same manner as flange 12 with the element 26. However, the annular protrusion 38 has been eliminated with a plurality of spherical balls 96 substituted therefor. A plurality of the balls 96 are to be located circumferentially about the element 26 and function in the same manner as the protrusion 38. The balls 96 are adapted to fit within an annular recess 98 formed within the flange 12'. The flange 12' will function substantially in the same manner as the flange 12. However, an easier pivoting motion is to be achieved through the inclusion of the separate elements, balls 96, located between the flange 12' and the shoulder 34 of the element 26. It is further to be understood that the balls 96 could be eliminated and other similar elements substituted therefor, such as, for example, a split ring member.

Figure 4:
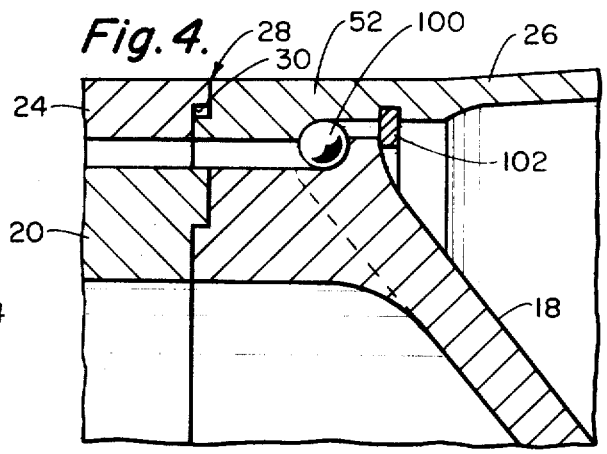
FIG. 4 is a cross-sectional view showing a modified form of pivot connection between the disc and the rim.

Referring in particular to FIG. 4 of the drawings, there is shown the connection between the disc 18 and the element 26. Following the teaching of FIG. 3, this type of connection could also be made to include a plurality of balls 100 or a split ring, if desired. Snap rings 102 are employed to retain the wheel parts together during assembly. In place of snap rings, other suitable fasteners could be employed as long as they do not interefere with the pivotal action of the wheel components as described above.

Figure 5:
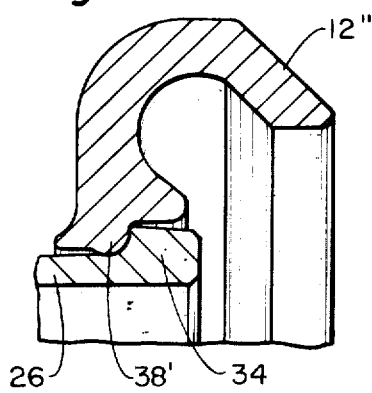
FIG. 5 is a view similar to FIG. 3 but of a first modified form of flange.
Figure 6:
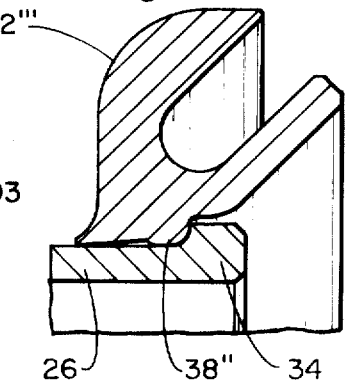
FIG. 6 is a view similar to FIG. 3 but of a second modified form of flange construction.
Figure 7:
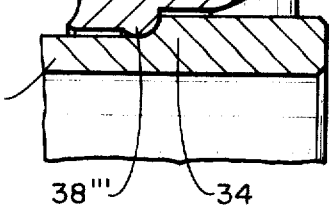
FIG. 7 is a view similar to FIG. 3 of a third modified form of flange construction.

Referring in particular to FIGS. 5 through 7, there is shown different configuration of the flange 12. It is to be noted that the annular protrusion 38' is mounted more adjacent the inner edge than the outer edge of the flange which is opposite of the teaching shown in FIG. 2. The amount of force required to effect a tilting or pivoting of the flange 12'' is more than that required in the embodiment of FIG. 2. The reason for this is that the flange 12'' must be pushed radially inward for deflection to occur. This is extremely difficult to do. The embodiment of FIG. 5 may be employed in conjunction with certain types of tires or upon certain types of aircraft where such is found to be more desirable.

Referring in particular to FIG. 6, a further modification of the flange 12''' is shown. The annular protrusion 38'' to be positioned substantially at the midpoint of the width of the flange 12'''. The embodiment of FIG. 6 should require a less force to be pivoted than the flange 12 but would require a greater force than the flange 12''.

The embodiment of FIG. 7 shows a flange 12'''' which includes a hollow annular opening 103. It is also to be noted that the protrusion 38'''' of FIG. 7 is mounted essentially in the position of the protrusion 38'.

The rim 16 of this invention is shown essentially symmetrical with the discs 18 and 20 being unsymmetrical. However, if desired, the discs 18 and 20 could be made symmetrical and still be within the scope of this invention as also the rim 16 could be made unsymmetrical.

Relating to the flange configuration shown in FIGS. 2, 5, 6 and 7, it is not necessary that the same flange be utilized in any one design. However, it is unlikely that different flanges would be employed since the tire would impart the same lateral load to each of the flanges.

It is desirable that during assembly of the wheel of this invention that the wheel be assembled into halves and then the halves connected together to form the wheel. In other words, the element 24 and the disc 20, and the element 70 would be connected together into a wheel half with the other wheel half being formed of elements 26 and 22, and disc 18. Any temporary retention method could be employed to hold the elements together of each wheel half so that the wheel halves will not become disassembled prior to final assembly. The retention method is to not interefere or restrain with the deflection about the pivot connection joints. Rotational slippage between the different components will be prevented by keying of adjacent components in a manner so as to not interefere with the performance of the pivot connections as described above. These anti-rotational devices between components could also provide retention of the discs 18 and 20 together in some instances. It is considered to be within the scope of this invention that there will be grease seals located within the hub section 22 to protect the bearings 80 and 82 and prevent the loss of lubrication. There would also be provision on the rim 16 for balance weights, not shown, to allow for correction of imbalance which might occur on the completed assembly including the tire.

It is to be understood to be within the scope of this invention to use the wheel of this invention in environments other than aircraft. Although the wheel of this invention is particularly adapted to aircraft wheel construction, it is feasible that the wheel could be used in land racing vehicles, wheels for heavy construction equipment and the like.

What is claimed is:

1. An aircraft wheel construction comprising:
   a hub section assembly adapted to be located about a wheel axle of an aircraft, a bearing assembly located between said hub section assembly and said axle;
   a tire supporting rim assembly;
   a flange exteriorly mounted by first means upon said rim adjacent each longitudinal edge of said rim, said first means for permitting axial pivotal movement of each of said flanges relative to said rim caused by lateral loads applied by the tire to said flanges, said flanges adapted to laterally restrain an inflatable tire;
   a first disc connected between said rim and said hub section, a second disc connected between said rim and said hub section, said first and second discs connected by second means to said rim, said second means for permitting pivotal movement of said first and second discs relative to said rim, third means for fixedly connecting together said first and second discs, said first and second discs connected by fourth means to said hub section, said fourth means for permitting pivotal movement of said discs relative to said hub section.

2. The aircraft wheel construction as defined in claim 1 wherein:
   said first means comprises an annular shoulder formed adjacent each longitudinal edge of said rim, each of said flanges having an annular rounded protrusion, said annular rounded protrusion of a said flange to cooperate against a said shoulder whereby each of said flanges is capable of pivotal movement in the axial direction with each of said annular rounded protrusions acting as the fulcrum against a said annular shoulder.

3. The aircraft wheel construction as defined in claim 1 wherein:
   said first means includes an annular shoulder formed upon said rim adjacent each longitudinal end of said rim, an annular recess formed within each of said flanges, a ring having a circular cross-section adapted to be located within said annular recess and in contact with a said annular shoulder.

4. The aircraft wheel construction as defined in claim 2 wherein:
   each of said flanges having an outer lateral surface and an inner lateral surface, the inflatable tire adapted to come into abutting contact with said inner lateral surfaces, the radial inner surface of said flange interconnecting said laterally inner and outer surfaces of said flange, said annular round protrusion of each of said flanges is formed upon said radially inner surface and located directly adjacent said laterally outer surface of said flange.

5. The aircraft wheel construction as defined in claim 2 wherein:
   each of said flanges having an outer lateral surface and an inner lateral surface, the inflatable tire adapted to come into abutting contact with said inner lateral surfaces, the radial inner surface of said flange interconnecting said laterally inner and outer surfaces of said flange, said annular round protrusion of each of said flanges is formed upon said radial inner surface and located direcly adjacent said laterally inner surface of said flange.

6. The aircraft wheel construction as defined in claim 1 wherein:
   said first means includes an annular shoulder formed upon said rim adjacent each longitudinal end of said rim, an annular recess formed within each of said flanges, a ring formed of a plurality of spherical balls adapted to be located within said annular recess and in contact with a said annular shoulder.

7. An aircraft wheel construction comprising:

a hub section assembly adapted to be located about a wheel axle of an aircraft, a bearing assembly located between said hub section assembly and said axle;

a tire supporting rim assembly;

a flange exteriorly mounted by first means upon said rim adjacent each longitudinal edge of said rim, said first means for permitting axial pivotal movement of each of said flanges relative to said rim caused by lateral loads applied by the tire to said flanges, said flanges adapted to laterally restrain an inflatable tire;

a first disc connected between said rim and said hub section, a second disc connected between said rim and said hub section, said first and second discs connected by second means to said rim, said second means for permitting pivotal movement of said first and second discs relative to said rim, third means for fixedly connecting together said first and second discs, said first and second discs connected by fourth means to said hub section, said fourth means for permitting pivotal movement of said discs relative to said hub section, and said hub section assembly is formed into two separate longitudinal sections interconnected together so that one section is capable of slight deflection relative to the other, said rim being constructed of two separate elements interconnected together so that one element is capable of a small amount of deflection relative to the other said element.

8. An aircraft wheel construction comprising:

a hub section assembly adapted to be located about a wheel axle of an aircraft, a bearing assembly located between said hub section assembly and said axle;

a tire supporting rim assembly;

a flange exteriorly mounted by first means upon said rim adjacent each longitudinal edge of said rim, said first means for permitting axial pivotal movement of each of said flanges relative to said rim caused by lateral loads applied by the tire to said flanges, said flanges adapted to laterally restrain an inflatable tire;

a first disc connected between said rim and said hub section, a second disc connected between said rim and said hub section, said first and second discs connected by second means to said rim, said second means for permitting pivotal movement of said first and second discs relative to said rim, third means for fixedly connecting together said first and second discs, said first and second discs connected by fourth means to said hub section, said fourth means for permitting pivotal movement of said discs relative to said hub section, and said second means includes an annular recess formed within each of said discs, a pair of annular shoulders formed interiorly of said rim in a closely spaced apart manner, a member having a circular cross section located within each of said annular recesses with a said circular cross-section member being in contact with a said annular shoulder.

* * * * *